(12) United States Patent
Chandler (10) Patent No.: US 7,466,927 B2
(45) Date of Patent: Dec. 16, 2008

(54) ELECTRO-ABSORPTION MODULATION OF OPTICAL SIGNALS

(75) Inventor: Simon John Chandler, Ipswich (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 726 days.

(21) Appl. No.: 10/916,632

(22) Filed: Aug. 12, 2004

(65) Prior Publication Data

US 2005/0041984 A1  Feb. 24, 2005

(30) Foreign Application Priority Data

Aug. 12, 2003  (GB) ................. 0318872.9

(51) Int. Cl.
*H04B 10/04* (2006.01)
*H04B 10/12* (2006.01)

(52) U.S. Cl. .................................... 398/193

(58) Field of Classification Search ......... 398/193–195, 398/198
See application file for complete search history.

(56) References Cited

U.S. PATENT DOCUMENTS 6,687,466 B1 * 2/2004 Chiappetta ................. 398/193

7,209,669 B2 * 4/2007 Kang et al. ................. 398/195
2004/0042801 A1 * 3/2004 Wedding ..................... 398/193

FOREIGN PATENT DOCUMENTS

EP  0741316  2/1993

* cited by examiner

*Primary Examiner*—Shi K Li (57) ABSTRACT

A signal having positive and negative going transitions drives an electro-absorption modulator. The signal is shaped into a waveform having an average value and first wave segments, each derived in response to a positive going transition. Each first wave segment is followed immediately by a second wave segment. Third wave segments are derived in response to each negative going transition. Each third segment is followed immediately by a fourth wave segment. Each first segment has a first magnitude and polarity relative to the average. Each second segment has a second magnitude relative to the average and the first polarity. Each third segment has a third magnitude relative to the average and a second polarity relative to the average. Each fourth wave segment has a fourth magnitude relative to the average and the second polarity. The first and third magnitudes are respectively greater than the second and fourth magnitudes.

31 Claims, 7 Drawing Sheets

ELECTRO-ABSORPTION MODULATION OF OPTICAL SIGNALS

FIELD OF INVENTION

The present invention relates to the use of an electro-absorption modulator in an optical data communications system.

BACKGROUND ART

There is an increasing need for optical fiber communications systems having higher data rates. One way in which laser radiation can be modulated at a high speed, for example in excess of 1 Gbits/s, is with the use of a distributed feedback (DFB) electro-absorption modulator (EAM). Such modulators may be integrated with a laser source on a semiconductor chip.

The bandwidth of a DFB-EAM integrated laser modulator (ILM) may be limited by parasitic capacitance in the EAM. A further problem arises in that such parasitic capacitance may be variable between devices produced from the same production process. Nominally identical devices may therefore have a range of maximum operating bandwidths, and hence maximum achievable data rates. For DFB-EAM devices operating at 10 Gbits/s a target system optical rise time (20% to 80%) would be about 39 ps, corresponding to a nominal parasitic capacitance of about 0.7 pF (with a 25 Ohm load and an 8.8 GHz bandwidth driver). A typical manufacturing variation on the nominal capacitance would be ±20%, giving a corresponding ±10% variation in the rise time.

An ideal modulator has a sharp transition between on and off states. In practice the EAM device has a finite bandwidth so the transitions are rounded and the rise time is increased. One solution to this problem is to apply comparatively more modulation power to the higher frequency components in the modulation signal, thus compensating for the roll off in the frequency response and speeding-up the transitions. However, in an EAM device, rapid changes in the output power cause a further problem, known as "chirp", which is a shift in wavelength due to a refractive index change in the semiconductor material of the modulator that accompanies changes in its absorption. Changes in wavelength result in increased dispersion in an optical fiber transmission line, which closes the so-called "eye pattern" of the modulated signal and increases the received bit error rate. Chirp therefore causes a loss of some or all of the potential benefit that might have been had from driving the electro absorption modulator at a higher power for those higher frequency components associated with sharp transitions in the modulated signal.

Conventional approaches to these problems involve designing the DFB-EAM device to minimize parasitic capacitance and to minimize chirp. Because of manufacturing variability, the modulation driver circuits are then designed to maximize the data rate for an average manufactured device. All of these approaches have their limitations.

It is an object of the present invention to address these issues.

SUMMARY OF INVENTION

One aspect of the invention relates to an apparatus for driving an electro-absorption modulator in response to a data input signal having spaced, alternate positive and negative going transitions. The apparatus comprises an input terminal adapted to be responsive to the data input signal, an output terminal adapted to supply a drive signal having an average value to the modulator, and shaping circuitry connected to (a) be responsive to the signal at the input terminal, and (b) supply the drive signal to the output terminal. The shaping circuitry is arranged to respond to the positive going transitions by deriving a first wave segment immediately followed by a second wave segment. The first segment has a first magnitude relative to the average value and a first polarity relative to the average value. The second segment has a second magnitude relative to the average value and the first polarity relative to the average value. The first magnitude is greater than the second magnitude. The shaping circuitry is arranged to respond to the negative going transitions by deriving a third wave segment immediately followed by a fourth wave segment. The third segment has a third magnitude relative to the average value and a second polarity relative to the average value. The fourth segment has a fourth magnitude relative to the average value and the second polarity. The third magnitude is greater than the fourth magnitude.

Another aspect of the invention concerns a method of driving an electro-absorption modulator by shaping a data input signal having spaced, alternate positive and negative going transitions into a waveform having an average value and (a) first wave segments each of which is derived in response to one of the positive going transitions, and (b) third wave segments each of which is derived in response to one of the negative going transitions. Each of the third wave segments is followed immediately by second and fourth wave segments, respectively. Each of the first wave segments has a first magnitude relative to the average value and a first polarity relative to the average value. Each of the second wave segments has a second magnitude relative to the average value and the first polarity. Each of the third wave segments has a third magnitude relative to the average value and a second polarity relative to the average value. Each of the fourth wave segments has a fourth magnitude relative to the average value and the second polarity. The first magnitude is greater than the second magnitude, and the third magnitude is greater than the fourth magnitude. The waveform is supplied to the modulator.

Preferably, the combined first and second waveform segments are symmetric with the combined third and fourth waveform segments relative to the average value.

The data signal has positive and negative going transitions such that there is a minimum duration between adjacent transitions going in the same direction. The durations of the first and third wave segments are preferably in the range of 20 to 40 percent of the duration between the adjacent transitions going in the same direction.

The modulator, as driven by the drive signal, has a range of parasitic capacitances. The difference in magnitudes between the first and second wave segments and the difference in magnitudes between the third and fourth wave segments are preferably determined by the range of parasitic capacitances.

The first and third magnitudes are equal to each other and the second and fourth magnitudes are equal to each other, the durations of the first and third wave segments are the same, and the durations of the second and fourth wave segments are the same.

According to another aspect of the invention, there is provided an optical data communications system for optical transmission of data, comprising an electro-absorption modulator (EAM) device for modulating optical radiation, a source of optical radiation for the EAM device, a signal input for receiving a data signal in the form of an input series of pulses, and a drive circuit for driving the modulation of the EAM device, the EAM device being arranged to receive the optical radiation from the source of optical radiation, the drive circuit being arranged to receive the data signal from the signal input and to generate therefrom a modulation series of pulses to drive the EAM device, the drive circuit comprising a first pulse generator, a second pulse generator, and a combining circuit, wherein:

the first pulse generator and the second pulse generator are arranged to generate in response to the input series of pulses respectively a first series of pulses and a second series of pulses, each of the pulses in the first series of pulses being paired with a pulse in the second series of pulses to form a pair of pulses, and both pulses of each pair of pulses having the same pulse duration, one of said pulses being delayed by a predetermined time period relative to the other pulse so that paired pulses overlap partially in time; and the combining circuit is arranged to combine said partially overlapping pulses to produce the modulation series of pulses, the combining circuit thereby producing a corresponding modulation pulse of said series of modulation pulses having a variable amplitude, said amplitude being attenuated during the time both pulses overlap and enhanced during at least the predetermined time period preceding the time both pulses overlap.

The EAM device may be coupled optically with a distributed feedback (DFB) source of optical radiation.

The predetermined time delay need not be fixed in advance, but may be controlled in order to help optimize the performance of the optical data communications system.

The EAM device will, in general, have some parasitic capacitance, resulting in a single-pole roll off of the frequency response of the device at higher frequencies. The inventors have discovered that pre-emphasis resulting from the waveform applied to the EAM device provides a useful gain in available bandwidth without causing chirp in an EAM device that would cause a corresponding closing of the eye pattern after transmission in an optical communications channel having dispersion.

The EAM device may be integrated in a distributed feedback (DFB) electro-absorption modulator, and the optical communications channel may be a single mode optical fiber transmission line.

The system may comprise additionally an optical output from the EAM device, and a fiber optical transmission line, the transmission line being arranged to receive from the output of the EAM device the modulated optical radiation.

The variable amplitude may be enhanced also during the predetermined time period following the time both pulses overlap. Thus, the invention can help to increase bandwidth on both the rising and falling edges of the modulation signal.

The first series of pulses and/or the second series of pulses may include a square type series of pulses, for example a series of substantially square and/or rectangular pulses. Such square type pulses are relatively simple to generate, as compared with more complex waveforms, particularly at the high frequencies typically used in optical data communications systems. The edges of the square type pulses need not be sharp, and at the typical operation frequencies of DFB-EAM devices will, in general, be somewhat rounded owing to electronic bandwidth limitations. The term "square type" as used herein is, however, intended to exclude sinusoidal or triangular type pulses.

Also according to an added aspect of the invention, there is provided a method of modulating a source of optical radiation using in an optical data communications system, the system comprising an electro-absorption modulator (EAM) device, a source of optical radiation, a signal input and a drive circuit, in which the method comprises the steps of:

i) providing optical radiation to the EAM device from the source of optical radiation;
ii) supplying a data signal in the form of an input series of pulses to the signal input;
iii) receiving at the drive circuit the data signal from the signal input;
iv) using the drive circuit to generate from the received data signal a modulation series of pulses;
v) using the modulation series of pulses to drive the EAM device and so modulate the optical radiation;

wherein vi) the drive circuit generates in response to the input series of pulses a first series of pulses and a second series of pulses, each of the pulses in the first series of pulses being paired with a pulse in the second series of pulses to form a pair of pulses, and both pulses of each pair of pulses having the same pulse duration, one of said pulses being delayed by a predetermined time period relative to the other pulse so that paired pulses overlap partially in time; and vii) the partially overlapping pulses are combined to produce the modulation series of pulses and so produce a corresponding modulation pulse of said series of modulation pulses having a variable amplitude, said amplitude being attenuated during the time both pulses overlap and enhanced during at least the predetermined time period preceding the time both pulses overlap.

BRIEF DESCRIPTION OF THE DRAWING

The invention will now be further described, by way of example only, with reference to the accompanying drawings, in which.

DETAILED DESCRIPTION OF THE DRAWING

Figure 1:
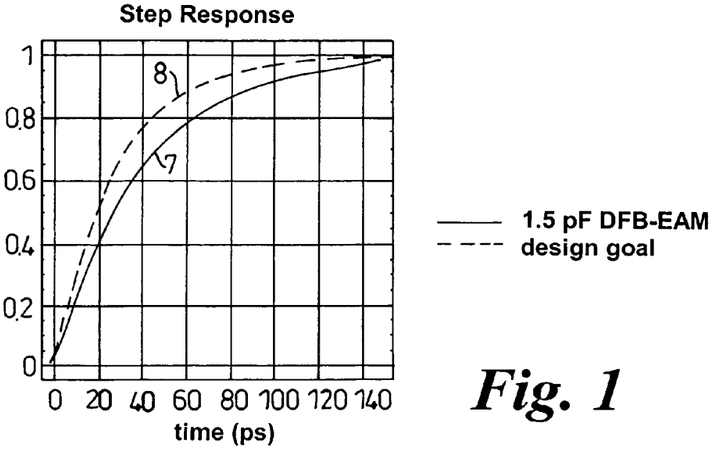
FIG. 1 is a step response plot for a conventional DFB EAM system and a desired improved DFB-EAM system.
Figure 2A:
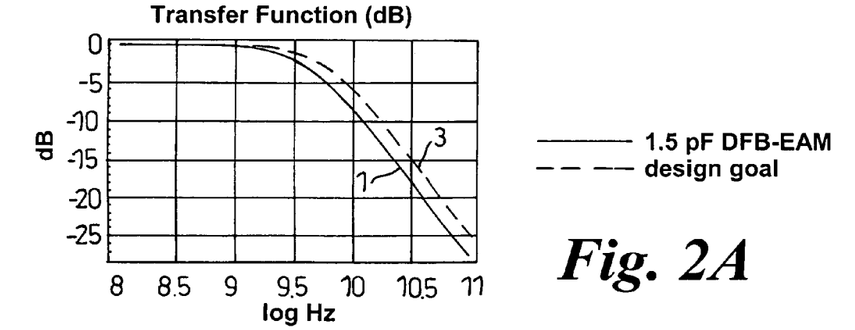
FIGS. 2A and 2B are transfer function plots of, respectively, decibels and degrees against frequency for a conventional DFB-EAM system and a desired improved DFB-EAM system.
Figure 2B:
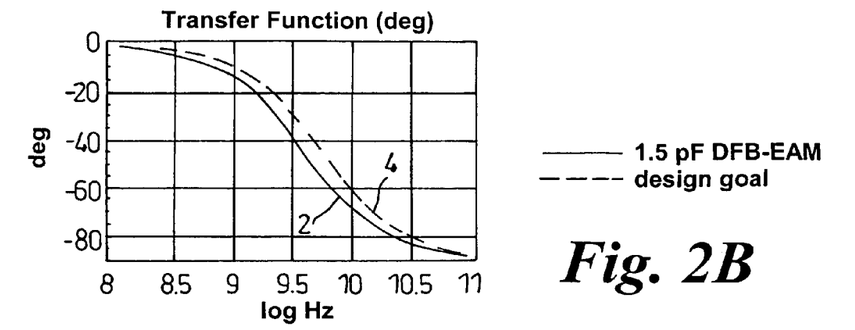

FIGS. 1, 2A and 2B are plots useful in describing the problem of limited bandwidth in a conventional distributed feedback electro-absorption modulation (DFB-EAM) system, comprising a DFB-EAM device having an unacceptably high parasitic capacitance of 1.5 pF. As illustrated in FIG. 1, the high parasitic capacitance is responsible for an increase in the risetime of the EAM step response, to the design goal of 38.6 ps, as shown by the dashed line 8, from 52 ps, as shown by the solid line 7. A risetime of 38.6 ps or lower is required for 10 Gbit/sec operation of the DFE-EAM. Rise time is defined here as the time for an output to rise from 20% to 80% of a full step height.

Another way of characterizing the system response is to plot the transfer function. As illustrated in FIG. 2A, the capacitance is responsible for a roll-off in the amplitude response of the system above about 1 GHz frequency as shown by the solid line 1. Coupled with the roll-off in response is a phase shift above 1 GHz, as shown by the solid line 2 in FIG. 2B.

The transfer function of the design goal is shown by the dashed lines 3,4 of FIGS. 2A and 2B. Devices with higher capacitance have transfer function curves shifted to lower frequencies, thereby reducing the maximum data transmission capacity.

Typical DFB-EAM devices have a range of capacitances owing to manufacturing variations. Since it is not feasible or economic to manufacture only DFB-EAM devices having the nominal capacitance or lower, an objective of the invention is to provide pre-equalization in an optical data communications system using a DFB-EAM device that shifts the transfer function of a high capacitance DFB-EAM device from the solid curves at least some way towards the dashed lines 3,4 of FIGS. 2A and 2B.

Figures 3A, 3B:
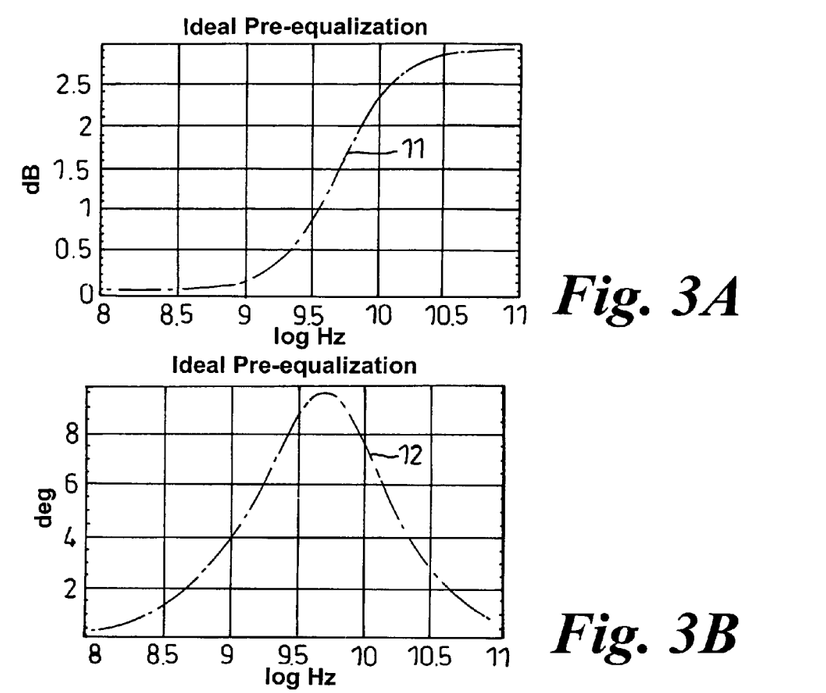
FIGS. 3A and 3B are plots of, respectively, decibels and degrees against frequency of a DFB-EAM driver having an ideal form of pre-equalization for a conventional DFM-EAM device.

Pre-equalization per se is, of course, a well-known technique. An ideal form is pre-equalization for the 1.5 DFB EAM is shown by the lines 11,12 of FIGS. 3A and 3B, which show, respectively, the pre-equalization that could be applied to the amplitude and phase of a data signal in a driver circuit used to drive the 1.5 pF DFB-EAM device.

Figure 4:
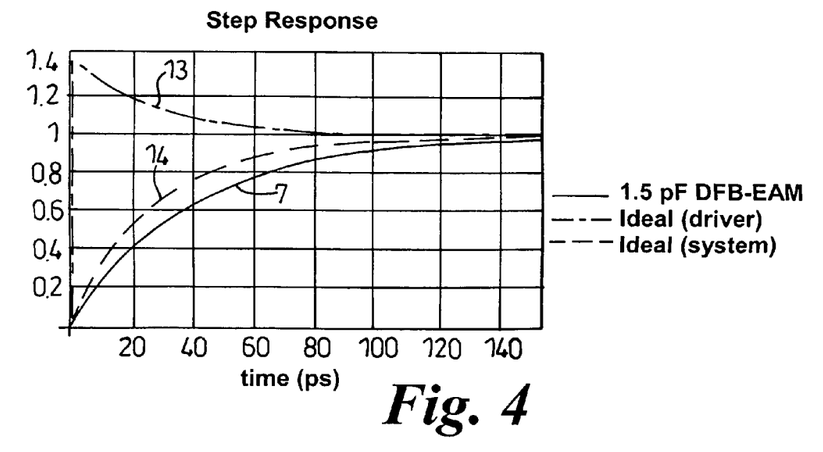
FIG. 4 includes plots of the step response of the ideally pre equalized driver, and the conventional DFB-EAM device with and without pre-equalization.

The corresponding time-domain curves are shown in FIG. 4, for the driver 13, the output of the equalized DFB-EAM system 14, and for comparison, the unequalized 1.5 pF DFB-EAM device 7. Because the equalization is ideal, line 14 is identical to the design goal, line 8 in FIG. 1.

However, this form of equalization is difficult to implement in practice. Moreover, it is known that a rapid change in the optical output power of an EAM increased the wavelength chirp. Consequently, attempts to reduce the EAM output risetime by equalization were expected to worsen the dispersion caused by chirp, and hence yield no overall improvement in the received bit error rate.

The inventors have shown that contrary to expectations the form of pre-equalization illustrated in FIGS. 5 to 11 provides a useful improvement in the maximum data transmission capacity of an optical communications system using an otherwise conventional 1.5 pF DFB-EAM device, even allowing for dispersion effects after transmission through a 40 km single mode optical fiber transmission link. This form of pre-equalization is referred to herein as "delay" pre-equalization.

Figure 5A:
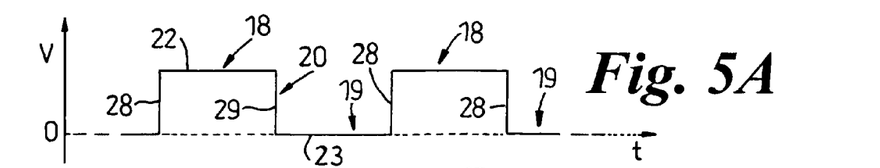
FIGS. 5A, 5B and 5C are waveforms of a conceptual method of modifying an idealized input data signal with "delay" pre-equalization in an optical data communications system according to a preferred embodiment of the invention.
Figure 5B:
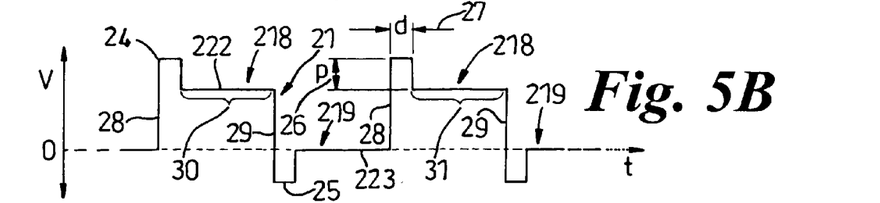
Figure 5C:
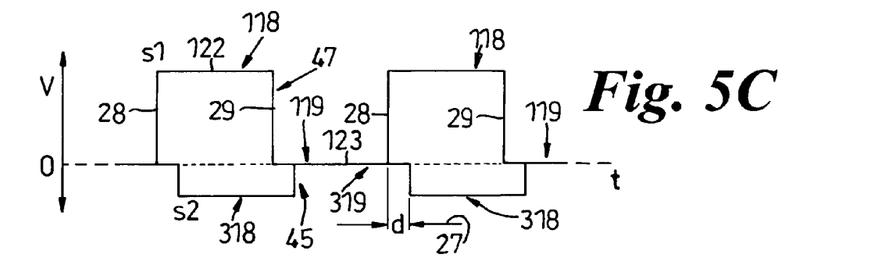

FIGS. 5B and 5C are waveforms that modify the input data signal of FIG. 5A to provide "delay" pre-equalization in an optical data communications system that enables the idealized characteristics to be approached or achieved. In FIG. 5A, the data input signal 20 is an idealized square wave having equal amplitude and duration positive and negative half phase pulses 18,19 of constant amplitude 22,23. In this example, the amplitude 22 of the positive half phase pulse 18 is a positive voltage including positive going transition 28, and the amplitude 23 of the negative half phase pulse 19, including negative going transition 29 is a zero voltage.

FIG. 5B is a pre-equalized waveform 21 in which the pre-equalization initially enhances a positive half phase pulse 218 in a positive sense 24, and initially enhances a negative half phase pulse 219 in a negative sense 25. Each of the enhanced portions 24,25 of the pre-equalized waveform 21 has an amplitude, which is enhanced by an amount 26 ($p$) that extends over a predetermined time 27 ($d$) beginning at the start of each half phase 18,19 corresponding with transitions 28 and 29. As explained in detail below, the time 27 ($d$) is a predetermined "delay" time. The subsequent portions 30,31 of each half-phase pulse 218,219 following the initially enhanced portions 24,25, are therefore relatively attenuated 222,223.

Figure 6:
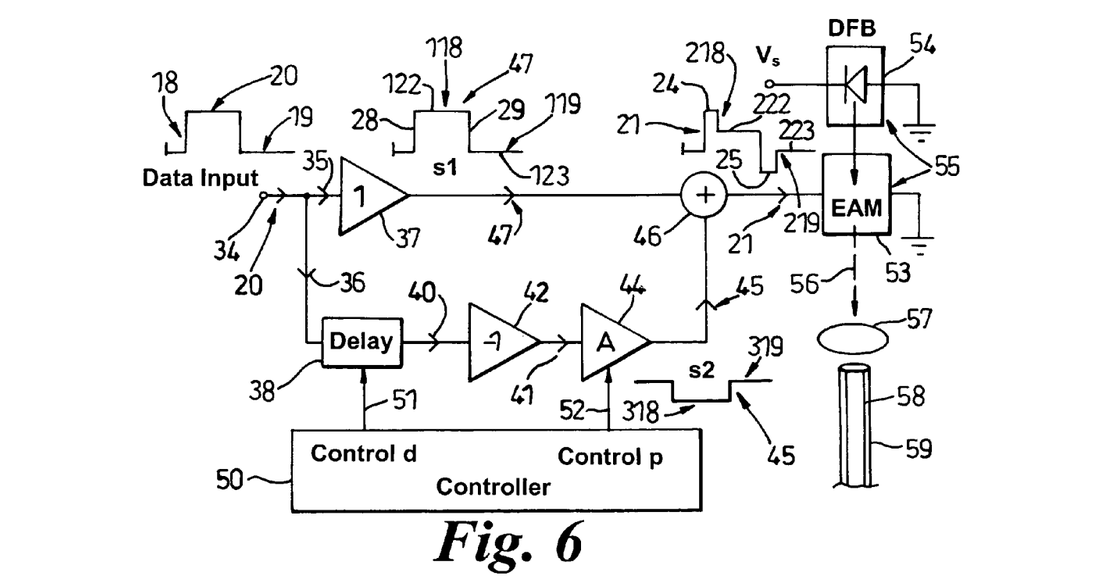
FIG. 6 is a block diagram of delay pre-equalization circuitry according to a preferred embodiment of the invention in a optical data communications system.

As shown in FIGS. 5C and 6, the pre-equalization waveform 21 can be readily formed from the original data signal, which need not be a square wave signal, but may be any form of digital data signal, for example a pulse-width modulated (PWM) signal. If it is desired that the subsequent portions 30,31 of the pre-equalized waveform 21 have the same amplitude 222,223 as the initial data signal 20, then the data signal is initially amplified.

FIG. 6 is a schematic diagram of an optical data communications system 10 that responds to the wave data signal 20 of FIG. 5A, to derive waveform 21 of FIG. 5B. The data signal 20 is supplied at a data input 34 of the system 10. The data input has two branches 35,36; branch 35 leads to the input of a non-inverting amplifier 37, and branch 36 leads to a delay circuit 38.

The non-inverting amplifier 37 generates an output signal (S1) 47 which has the same shape as the data signal 20, but which may have an enhanced or attenuated amplitude 122, 123 in each half-phase pulse 118,119. In the present example, the amplitude 122 of the positive half phase pulse 118 is enhanced relative to amplitude 22 for the data signal 20, and the amplitude 123 of the negative half phase pulse 119 is zero, as with the data signal 20.

The delay circuit 38 adds the delay time 27 having a duration, d, as illustrated in FIG. 5B, to the data signal 20 to produce a delayed data signal 40, which is similar to the original data signal 20, but delayed in time.

The delayed data signal 40 is inverted to form signal 41 by an inverting amplifier 42, and the inverted delayed signal 41 is supplied to a control amplifier 44, here an attenuator, that controls the amplitude of the delayed inverted signal 41. The control amplifier 44 therefore provides an output 45 consisting of alternate negative and positive going half cycle pulses 318,319, each of which has the same duration as the corresponding positive and negative going half cycle pulses 18,19 of the input data signal 20.

The output 45 from the control amplifier 44 (S2) is supplied as a delayed signal to a combining circuit 46, here an adding circuit, together with the non-delayed output 47 (S1) from the non-inverting amplifier 37. The non-inverting amplifier 37 optionally amplifies or attenuates the original data signal 20.

In this example the non-delayed signal 47 (S1) is the first series of pulses and the delayed signal 45 (S2) is the second series of pulses.

FIG. 5C shows in more detail amplitudes and phases of the delayed and non-delayed signals 45,47 (S1,S2), and how the adding circuit 46 adds these signals 45,47 to generate the pre-equalized waveform 21.

Control electronics 50 may also be provided to control the amount of the pre-determined delay time 27 ($d$) and the amplitude difference 26 ($p$) between the enhanced portions 24,25 and attenuated portions 22,23 of the pre-equalized waveform 21. This may be done by providing control lines 51,52 from the electronic controller 50 to the delay circuit 38 and the control amplifier 44. The delay is such that the signals 45,47 have corresponding half cycle pulses 118,318;119,319 which are partially overlapping. In general both the delay time 27 ($d$) and the amplitude difference 26 ($p$) should be adjusted to optimize the equalization for a particular value of parasitic capacitance. However, it is often sufficient for the delay value to be fixed at a predetermined value preferably in the range of 20% to 40% of the shortest bit time (i.e., the period between adjacent positive going leading edges 28 or between adjacent negative going trailing edges 29), which for 10 Gbit/s is 100 ps. Adjusting the equalization to compensate for a particular parasitic capacitance is then achieved by changing the amplitude difference 26 ($p$)

Optionally, the controller may also control the operation of the non inverting amplifier 37 (not shown) in a similar manner to the control of the control amplifier 44. The controller may therefore be capable of varying the amplitude of the pulses 118,119 in the first series of pulses 47 (S1) and/or the pulses 318,318 in the second series of pulses 45 (S2).

The pre-equalized waveform 21 is then supplied as an input to a conventional DFB-EAM device 55 as a modulation series of pulses. The device 55 includes a source of optical radiation 54 such as an infra-red laser diode, and an EAM modulator 53. The modulation series of pulses 21 has a symmetric amplitude above and below an average amplitude.

The operation and construction of DFB-EAM devices are well known to those skilled in the art, and so will not be further described.

The modulation series of pulses 21 naturally follows the input data signal 20, and so the DFB-EAM device 55 produces an optical output 56 that is modulated according to the input data signal 20. The optical output 56 is coupled by means a lens system 57 into a core 58 of a single mode fiber-optic transmission link 59.

The apparatus and method as described above are, however, idealized to the extent that the depicted signals do not take account of the finite bandwidth of the electrical drive circuitry and the parasitic capacitance of the DFB-EAM device 55. These effects are illustrated in FIGS. 7-11.

Figure 7:
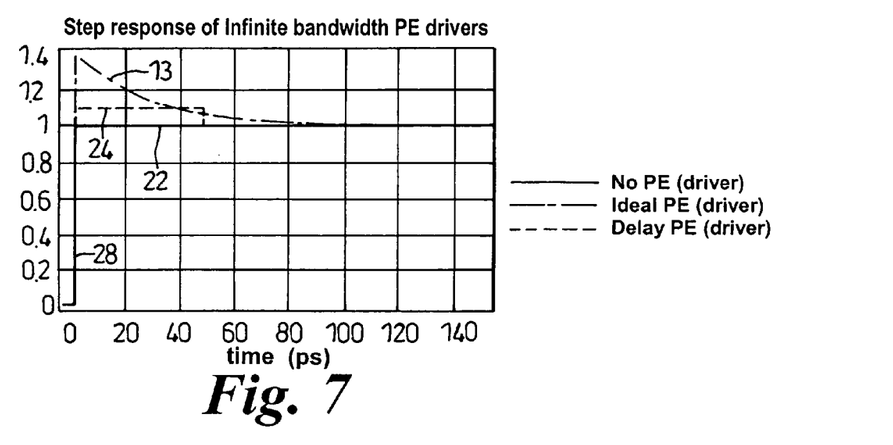
FIG. 7 includes plots of the output of an infinite bandwidth driver for the DFB-EAM device, for the cases of ideal pre-equalization, no pre-equalization and delay pre-equalization according to a preferred embodiment of the invention.

FIG. 7 includes plots of the output of an infinite bandwidth driver for the DFB-EAM device 55, for the cases of ideal pre equalization 13, no pre-equalization 22 and delay pre equalization 24, as described above.

Figure 8:
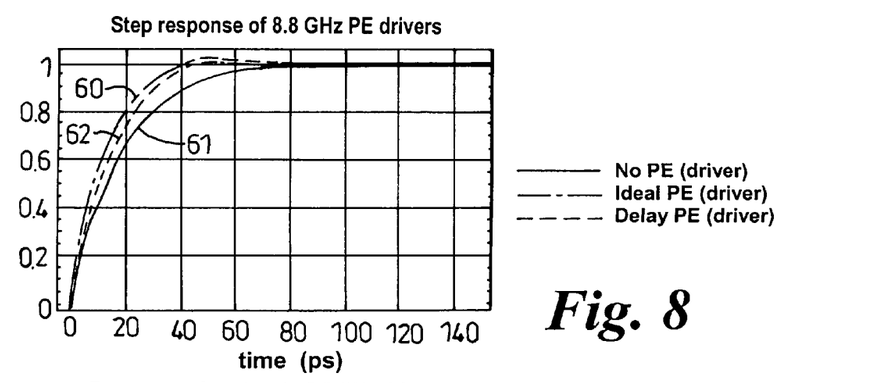
FIG. 8 includes plots of the output of an 8.8 GHz bandwidth driver for the DFB-EAM device, for the cases of ideal pre equalization, no pre-equalization and delay pre-equalization according to a preferred embodiment of the invention.

By way of comparison FIG. 8 includes plots of the output of an 8.8 GHz bandwidth driver for the DFB-EAM device, for the cases of ideal pre-equalization 60, no pre-equalization 61 and the delay pre-equalization 62 described above. It is notable how much of the effect of the ideal pre-equalization 13 is lost by the limited bandwidth of the 8.8 GHz driver.

Figure 9:
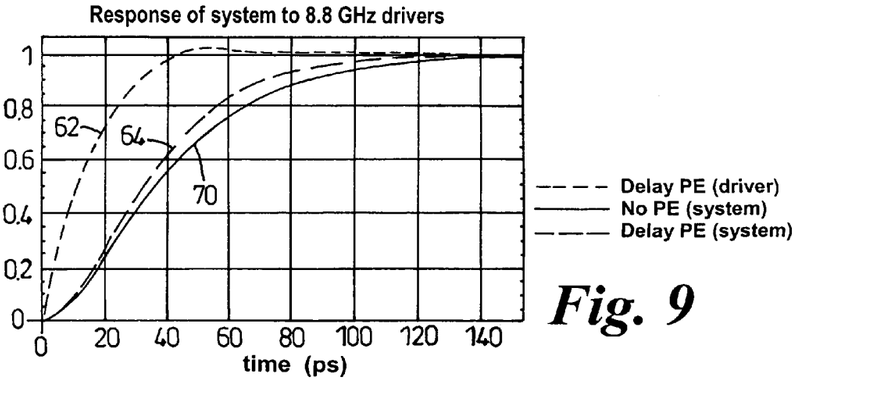
FIG. 9 shows the response of an EAM device to the 8.8 GHz bandwidth driver for the case of delay pre equalization according to a preferred embodiment of the invention, the resulting response of DFB-EAM system according to a preferred embodiment of the invention, and the response of the conventional JJFB-EAM system with no pre-equalization.

FIG. 9 includes plots for comparing the output of an 8.8 GHz bandwidth driver having delay pre-equalization 62, and the resulting step response 64 of the DFB-EAM system of FIG. 6, and the step response 70 of the conventional DFB-EAM system with no pre-equalization. As can be seen, the step response is further degraded by the parasitic 1.5 pF capacitance of the DFB-EAM device 55.

Figure 10:
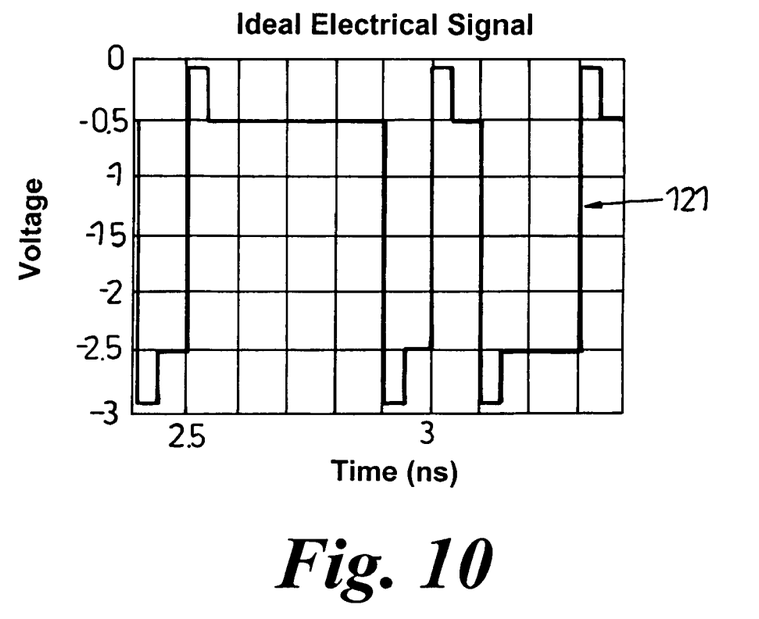
FIG. 10 is a plot of an ideal data modulation signal after pre-equalization according to a preferred embodiment of the invention.
Figure 11:
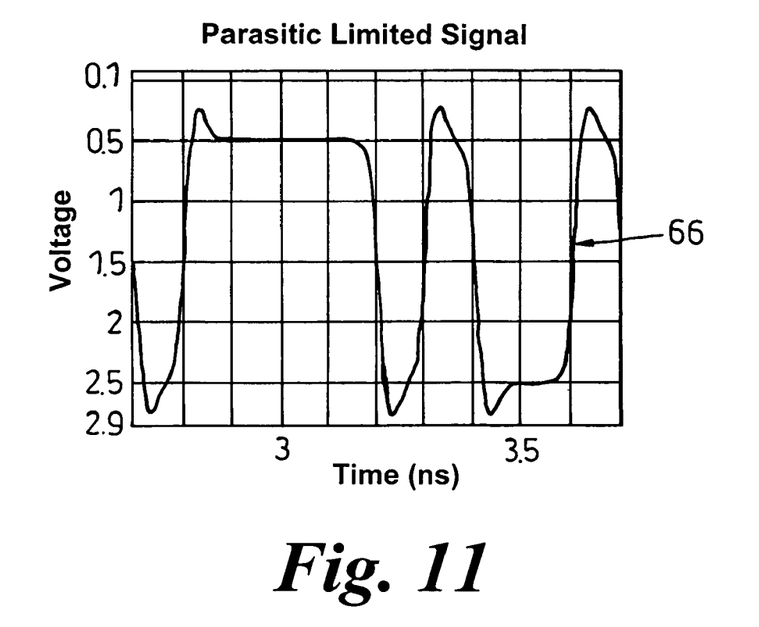
FIG. 11 is a plot of the data modulation signal of FIG. 10, taking into account the parasitic losses from the DFB-EAM device.

The total effect of these bandwidth limitations is shown by a comparison of FIGS. 10 and 11, respectively show a plot of an ideal pulse-width modulated data modulation signal 121 after delay pre-equalization, and a plot of the actual data modulation signal 66, taking into account the bandwidth of the DEB-EAM driver electronics and the parasitic losses from the DFB-EAM device. The actual shape of the delay pre-equalization signal therefore depends on the bandwidth of drive electronics and the parasitic capacitance of the DFB-EAM device 55, but in general falls between the shape of the curves 121,66 shown in FIGS. 10 and 11.

Figure 12A:
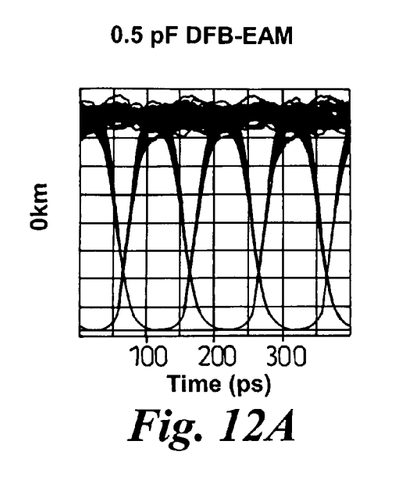
FIGS. 12A and 12B are waveforms of eye pattern signals of the optical output of a DFB-EAM device having 0.5 pF capacitance, taken respectively at an optical output of the device and after transmission through 40 km of a single mode optical fiber having dispersion.
Figure 12B:
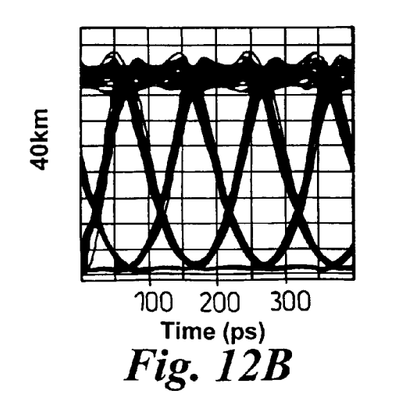

FIGS. 12A and 12B are eye pattern signals of the optical output of a DFB-EAM device 55 having 0.5 pF capacitance, taken respectively at an optical output of the device and after transmission through 40 km of a single mode optical fiber having dispersion. These eye patterns therefore represent an ideal design goal.

Figure 13A:
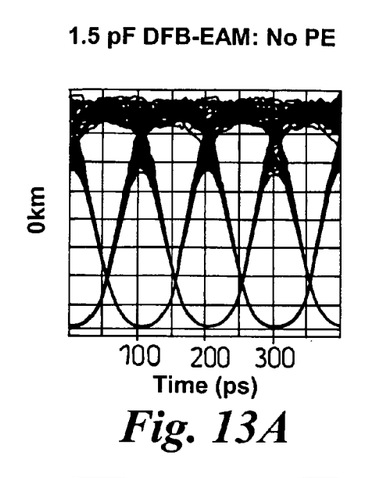
FIGS. 13A and 13B are waveforms of eye pattern signals similar to those of FIGS. 12A and 123, but for a DFB-EAM device having 1.5 pF capacitance.
Figure 13B:
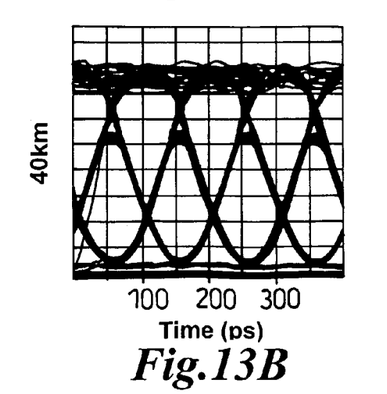

FIGS. 13A and 13B are eye pattern signals similar to those of FIGS. 12A and 12B, but for a DFB-EAM device 55 having 1.5 pF capacitance, and no pre-equalization. As can be seen from FIG. 13B, the "eye" of the eye pattern is substantially closed, which will in many data communications applications result in an unacceptably high bit error rate.

Figure 14A:
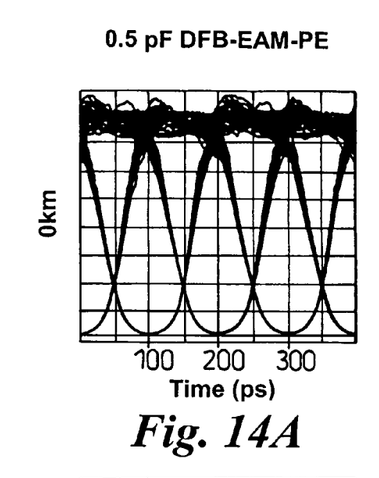
FIGS. 14A and 14B are waveforms of eye pattern signals similar to those of FIGS. 13A and 13B, but for a DFB-EAM device having delay pre-equalization in the optical data communications system according to the invention.
Figure 14B:
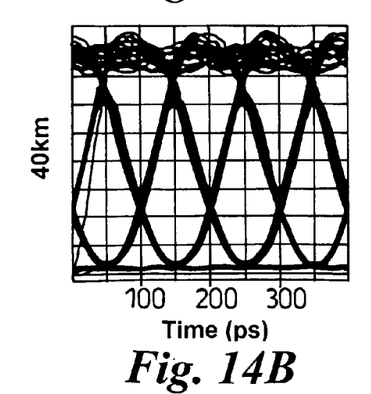

FIGS. 14A and 14B are eye pattern signals similar to those of FIGS. 13A and 13B, but for a DFB-EAM device 55 having delay pre-equalization in the optical data communications system described above. A comparison of FIGS. 12B and 14B demonstrates that the delay pre-equalization of the invention substantially restores the quality of the eye pattern, showing that over a 40 km long optical fiber transmission link, any losses due to increased chirp and dispersion are more than offset by a reduced risetime in the response 64 of the driven DFB-EAM device 55. The delay pre equalization shown in FIGS. 14A and 14B has not been optimized, so the quality of the eye pattern could be further improved.

Figure 15:
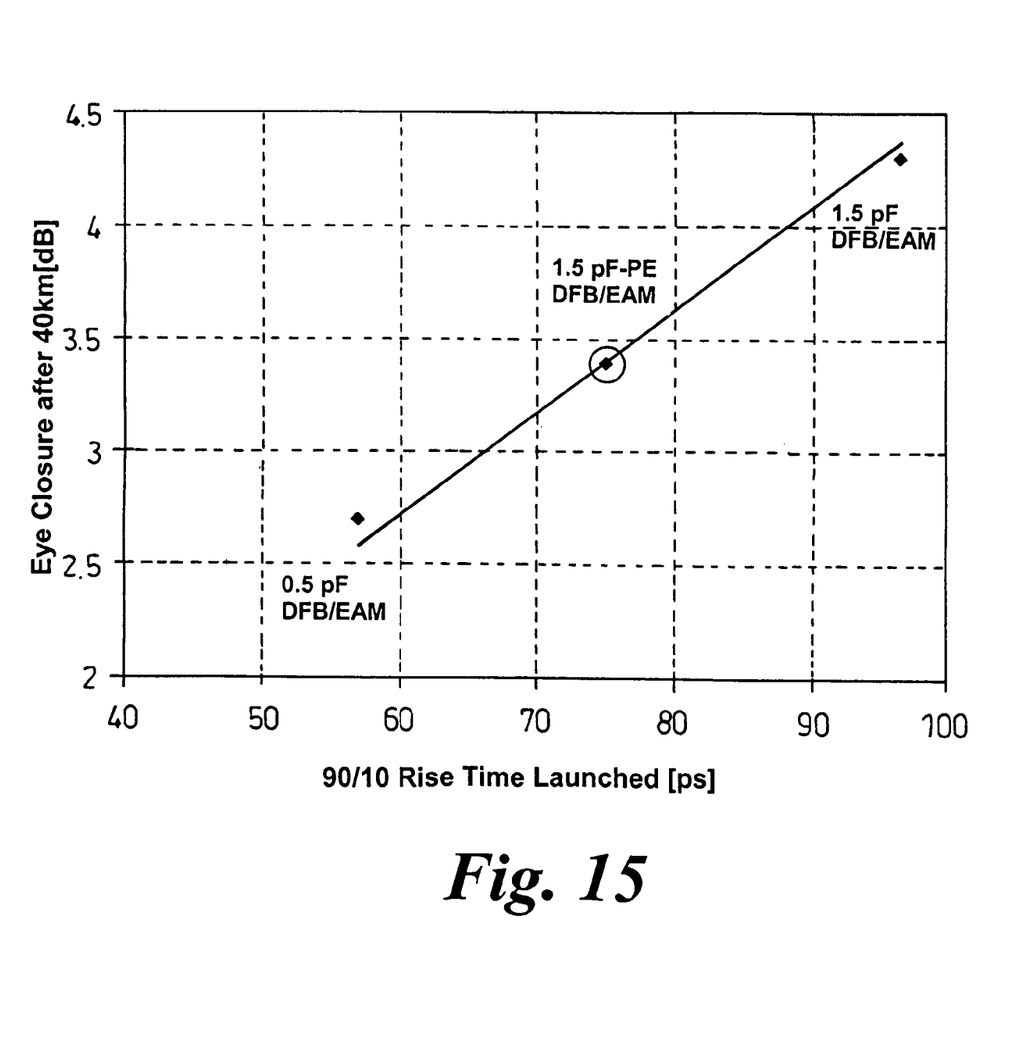
FIG. 15 is a plot of a measure of eye-pattern quality for the eye patterns of FIGS. 12B 13B and 14B

A quantitative analysis of the three eye patterns shown in FIGS. 12B, 13B and 14B is shown in FIG. 15, which is a plot of a measure of eye-pattern quality against a 10% to 90% measure of step response rise time of the driven DFB-EAM device 55. The results lie essentially on a straight line, showing that the risetime can be substantially reduced by delay pre-equalization without compromising dispersion, so giving an overall improvement in eye quality and bit error rate.

In summary, the invention may use two separate square wave signal sources with corresponding pulses that overlap in time. One of the pulses is delayed relative to the other pulse, and then combined and subtracted (or added, depending on the polarity) from the earlier pulse, thereby creating a falling step signal. A number of parameters may be controlled by control electronics, which may be a microcontroller operating under software control. These parameters include: the initial, enhanced pulse height; the secondary, attenuated pulse height; and the delay time 27 (*d*) from the start of the initial pulse to the start of the secondary pulse. The amplitude of the secondary attenuated pulse height is equal to the pre-emphasis step height 26 (*p*). The difference between the initial pulse height and the secondary pulse height yields the amplitude of the subsequent portion 30 of the half phase pulse 118, and the delay time 27 gives a pre-emphasis step length. These parameters may be fixed at optimum values for the nominal design of the DFB-EAM device, or these may be adjusted during the manufacture of the system to fine-tune individually the performance of each unit.

In the embodiment shown in the drawings, both pulses 218,219 have the same pulse length, which gives equal pre-emphasis to rising and falling edges 28,29. This may be the required design in most applications of the invention, and simplifies the control electronics or logic needed to drive the DFB-EAM device.

The results show that the discussed pre-emphasis can reduce the rise times and fall times of the drive voltage of a relatively high capacitance DFB-EAM device, thereby opening up the eye pattern of a pulse-width modulated signal having eye crossings every 100 ps. Furthermore, the eye pattern is still open after the optical signal has passed through 40 km of standard dispersion single mode fiber 59, thus showing that this type of pre-emphasis, surprisingly, does not adversely affect the chirp characteristics of the DFB-EAM device 55.

Because the pre-emphasis also affects the speed of the optical transition, it may be used to control the amount of chirp and hence the amount of resulting dispersion. The system may therefore be readily tuned to different applications, with a higher degree of chirp being permissible in a relatively short optical fiber transmission link, and a correspondingly lesser amount of chirp being permissible in a longer optical fiber link.

The circuit of FIG. 6 preserves the benefits of a simple modulated square type signal source 20, by using only two such similar modulated square type signal sources that supply signals to outputs 45 and 47 wherein the sources derive pulses offset by a desired time delay 27 (*d*), which are supplied to linear combiner 46 that combines them in a simple subtractive or additive combination. The apparatus therefore imposes a minimal additional hardware cost in the drive electronics, yet provides a significant performance gain.

The pre-emphasis system provides a simple but effective way of controlling the frequency content of the modulated voltage signal that drives the EAM device 55. The frequency content may be set to significantly but not ideally compensate for residual parasitic capacitance in the DFB-EAM design, and in particular, may be tailored to accommodate for manufacturing variability, for example by varying the pre-emphasis step height and/or step length to optimize performance of a particular DFB-EAM device 55.

It should be noted that although the system has been described in detail with reference to a DFB-EAM device, the technique is equally applicable to a discrete EAM using an external discrete optical source.

I claim:

1. An optical data communications system for optical transmission of data, comprising an electro-absorption modulator (EAM) device for modulating optical radiation, a source of optical radiation for the EAM device, a signal input for receiving a data signal in the form of an input series of pulses, and a drive circuit for driving the modulation of the EAM device, the EAM device being arranged to receive the optical radiation from the source of optical radiation, the drive circuit being arranged to receive the data signal from the signal input and to generate therefrom a modulation series of pulses to drive the EAM device, the drive circuit comprising a first pulse generator, a second pulse generator, and a combining circuit, wherein:

the first pulse generator and the second pulse generator are arranged to generate in response to the input series of pulses respectively a first series of pulses and a second series of pulses, each of the pulses in the first series of pulses being paired with a pulse in the second series of pulses to form a pair of pulses, and both pulses of each pair of pulses having the same pulse duration, one of said pulses being delayed by a predetermined time period relative to the other pulse that paired pulses overlap partially in time; and the combining circuit is arranged to combine said partially overlapping pulses to produce the modulation series of pulses, the combining circuit thereby producing a corresponding modulation pulse of said series of modulation pulses having differing amplitudes, said differing amplitudes being attenuated during the time both pulses overlap and enhanced during at least the predetermined time period preceding the time both pulses overlap.

2. An optical data communications system as claimed in claim 1, in which the amplitude is enhanced during the predetermined time period following the time both pulses overlap.

3. An optical data communications system as claimed in claim 1 in which at least one of the first series of pulses and the second series of pulses consist(s) of at least one of square type series of pulses.

4. An optical data communications system as claimed in claim 3, in which the first series of pulses and the second series of pulses each comprise a series of at least one of square and rectangular pulses.

5. An optical data communications system as claimed in claim 3, in which the first series of pulses and the second series of pulses have different maximum pulse amplitudes.

6. An optical data communications system as claimed in claim 1, in which the first series of pulses and the second series of pulses each have the same polarity and the combining circuit is arranged to combine said partially overlapping pulses to produce the modulation series of pulses by subtracting the amplitude of one of the series of pulses from the amplitude of the other series of pulses.

7. An optical data communications system as claimed in claim 1, additionally comprising a controller arranged to control the operation of the at least one first pulse generator and the second pulse generator.

8. An optical data communications system as claimed in claim 7, in which the controller is capable of varying the predetermined time period.

9. An optical data communications system as claimed in claim 7, in which the controller is capable of varying at least one of the amplitude of the pulses in the first series of pulses and the amplitude of the pulses in the second series of pulses.

10. An optical data communications system as claimed in claim 1, in which the modulation series of pulses has a symmetric amplitude above and below an average amplitude.

11. A method of modulating a source of optical radiation of an optical data communications system, the system comprising an electro-absorption modulator (EAM) device, a source of optical radiation, a signal input and a drive circuit, in which the method comprises the steps of:

i) supplying optical radiation to the EAM device from the source of optical radiation;

ii) supplying a data signal in the form of an input series of pulses to the signal input;
iii) receiving at the drive circuit the data signal from the signal input;
iv) generating from the received data signal a modulation series of pulses by using the drive circuit;
v) driving the EAM device and so modulate the optical radiation by using the modulation series of pulses;

wherein vi) the drive circuit generates in response to the input series of pulses a first series of pulses and a second series of pulses, each of the pulses in the first series of pulses being paired with a pulse in the second series of pulses to form a pair of pulses, and both pulses of each pair of pulses having the same pulse duration, one of said pulses being delayed by a predetermined time period relative to the other pulse so that paired pulses overlap partially in time; and vii) producing the modulation series of pulses by combining the partially overlapping pulses and so produce a corresponding modulation pulse of said series of modulation pulses having a variable amplitude, said amplitude being attenuated during the time both pulses overlap and enhanced during at least the predetermined time period preceding the time both pulses overlap.

12. Apparatus for driving an electro-absorption modulator in response to a data input signal having spaced, alternate positive and negative going transitions comprising an input terminal adapted to be responsive to the data input signal, an output terminal adapter to supply a drive signal having an average value to the modulator, and shaping circuitry connected to (a) be responsive to the signal at the input terminal, and (b) supply the drive signal to the output terminal, the shaping circuitry being arranged to respond to (i) the positive going transitions by deriving a first wave segment immediately followed by a second wave segment, the first segment having a first magnitude relative to the average value and a first polarity relative to the average value, the second segment having a second magnitude relative to the average value and the first polarity relative to the average value, the first magnitude being greater than the second magnitude, and (ii) the negative going transitions by deriving a third wave segment immediately followed by a fourth wave segment, the third segment having a third magnitude relative to the average value and a second polarity relative to the average value, the fourth segment having a fourth magnitude relative to the average value and the second polarity, the third magnitude being greater than the fourth magnitude.

13. The apparatus of claim 12 wherein the combined first and second waveform segments are symmetric with the combined third and fourth waveform segments relative to the average value.

14. The apparatus of claim 13 wherein the data signal has positive and negative going transitions such that there is a minimum duration between adjacent transitions going in the same direction, the durations of the first and third wave segments being in the range of 20 to 40 percent of the duration between the adjacent transitions going in the same direction.

15. The apparatus of claim 14 wherein the modulator has a range of parasitic capacitances, the difference in magnitudes between the first and second wave segments and the difference in magnitudes between the third and fourth wave segments being determined by the range of parasitic capacitances.

16. The apparatus of claim 12 wherein the first and third magnitudes are equal to each other and the second and fourth magnitudes are equal to each other.

17. The apparatus of claim 16 wherein the durations of the first and third wave segments are the same and the durations of the second and fourth wave segments are the same.

18. The apparatus of claim 12 wherein the data signal has positive and negative going transitions such that there is a minimum duration between adjacent transitions going in the same direction, the durations of the first and third wave segments being in the range of 20 to 40 percent of the duration between the adjacent transitions going in the same direction.

19. The apparatus of claim 16 wherein the modulator has a range of parasitic capacitances, the difference in magnitudes between the first and second wave segments and the difference in magnitudes between the third and fourth wave segments being determined by the range of parasitic capacitances.

20. The apparatus of claim 12 wherein the modulator has a range of parasitic capacitances, the difference in magnitudes between the first and second wave segments and the difference in magnitudes between the third and fourth wave segments being determined by the range of parasitic capacitances.

21. The apparatus of claim 12 in combination with an electro-absorption modulator having an input connected to be driven by the drive signal.

22. The apparatus of claim 20 in combination with an electro-absorption modulator having an input connected to be driven by the drive signal.

23. A method of driving an electro-absorption modulator comprising the steps of:

shaping a data input signal having spaced, alternate positive and negative going transitions into a waveform having an average value and (a) first wave segments each of which is derived in response to one of the positive going transitions, each of the first wave segments being followed immediately by a second wave segment, and (b) third wave segments each of which is derived in response to one of the negative going transitions, each of the third wave segments being followed immediately by a fourth wave segment, each of the first wave segments having a first magnitude relative to the average value and a first polarity relative to the average value, each of the second wave segments having a second magnitude relative to the average value and the first polarity, each of the third wave segments having a third magnitude relative to the average value and a second polarity relative to the average value, each of the fourth wave segments having a fourth magnitude relative to the average value and the second polarity, the first magnitude being greater than the second magnitude, the third magnitude being greater than the fourth magnitude, and supplying the waveform to the modulator.

24. The method of claim 23 wherein the combined first and second waveform segments are symmetric with the combined third and fourth waveform segments relative to the average value.

25. The method of claim 24 wherein the data signal has positive and negative going transitions such that there is a minimum duration between adjacent transitions going in the same direction, the durations of the first and third wave segments being in the range of 20 to 40 percent of the duration between the adjacent transitions going in the same direction.

26. The method of claim 25 wherein the modulator has a range of parasitic capacitances, the difference in magnitudes between the first and second wave segments and the difference in magnitudes between the third and fourth wave segments being determined by the range of parasitic capacitances.

27. The method of claim 23 wherein the first and third magnitudes are equal to each other and the second and fourth magnitudes are equal to each other.

28. The method of claim 27 wherein the durations of the first and third wave segments are the same and the durations of the second and fourth wave segments are the same.

29. The method of claim 23 wherein the data signal has positive and negative going transitions such that there is a minimum duration between adjacent transitions going in the same direction, the durations of the first and third wave segments being in the range of 20 to 40 percent of the duration between the adjacent transitions going in the same direction.

30. The method of claim 27 wherein the modulator has a range of parasitic capacitances, the difference in magnitudes between the first and second wave segments and the difference in magnitudes between the third and fourth wave segments being determined by the range of parasitic capacitances.

31. The method of claim 23 wherein the modulator has a range of parasitic capacitances, the difference in magnitudes between the first and second wave segments and the difference in magnitudes between the third and fourth wave segments being determined by the range of parasitic capacitances.

* * * * *